(12) United States Patent
Rowson et al.

(10) Patent No.: US 7,596,751 B2
(45) Date of Patent: Sep. 29, 2009

(54) CONTACT SHEET BASED IMAGE MANAGEMENT

(75) Inventors: James A. Rowson, Fremont, CA (US); Eamonn O'Brien-Strain, San Mateo, CA (US); John C. Schettino, Jr., San Jose, CA (US); Gary E. Herman, Palo Alto, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 669 days.

(21) Appl. No.: 11/112,892

(22) Filed: Apr. 22, 2005

(65) Prior Publication Data

US 2006/0242567 A1 Oct. 26, 2006

(51) Int. Cl.
 *G06F 17/00* (2006.01)
(52) U.S. Cl. .................................. 715/255; 715/200
(58) Field of Classification Search .............. 715/230, 715/231, 232, 277, 246, 200, 243, 255, 838
See application file for complete search history.

(56) References Cited

U.S. PATENT DOCUMENTS

| | | | | |
|---|---|---|---|---|
| 5,862,243 A * | 1/1999 | Baker et al. | ................. | 382/101 |
| 5,917,936 A * | 6/1999 | Katto | ........................ | 382/154 |
| 6,493,108 B1 * | 12/2002 | Hirai | ........................ | 358/1.18 |
| 6,573,974 B1 * | 6/2003 | Ikeda et al. | .................... | 355/25 |
| 6,690,843 B1 * | 2/2004 | Squilla et al. | ............... | 382/306 |
| 6,784,925 B1 * | 8/2004 | Tomat et al. | ........... | 348/207.11 |
| 6,937,275 B2 * | 8/2005 | Heiles | ..................... | 348/231.2 |
| 7,009,726 B2 * | 3/2006 | Lumley | ..................... | 358/1.15 |
| 7,010,751 B2 * | 3/2006 | Shneiderman | .............. | 715/232 |
| 7,366,994 B2 * | 4/2008 | Loui | .......................... | 715/764 |
| 2002/0021828 A1 * | 2/2002 | Papier et al. | ................. | 382/128 |
| 2002/0049702 A1 * | 4/2002 | Aizikowitz et al. | ............ | 707/1 |
| 2002/0051208 A1 * | 5/2002 | Venable | ..................... | 358/1.18 |
| 2002/0080387 A1 * | 6/2002 | Grasso et al. | ............. | 358/1.15 |
| 2002/0126159 A1 * | 9/2002 | Pilu | .......................... | 345/838 |
| 2003/0117502 A1 * | 6/2003 | Heiles | ..................... | 348/231.2 |
| 2004/0179115 A1 * | 9/2004 | Tomat et al. | ............ | 348/231.6 |
| 2005/0031190 A1 | 2/2005 | Gann | | |
| 2005/0163463 A1 * | 7/2005 | Schick et al. | ................... | 386/4 |
| 2005/0225678 A1 * | 10/2005 | Zisserman et al. | .......... | 348/571 |
| 2005/0281535 A1 * | 12/2005 | Fu et al. | ........................ | 386/69 |
| 2006/0065733 A1 * | 3/2006 | Lee et al. | ............... | 235/462.01 |
| 2006/0136478 A1 * | 6/2006 | Berkner | ...................... | 707/102 |
| 2006/0192791 A1 * | 8/2006 | Schick et al. | ............... | 345/661 |
| 2007/0091376 A1 * | 4/2007 | Calhoon et al. | ............ | 358/3.28 |

OTHER PUBLICATIONS

Keller et al., Supporting Informal Collection of digital images: organizing, browsing and sharing, ACM 2004, pp. 1-4.*

(Continued)

*Primary Examiner*—Cong-Lac Huynh (57) ABSTRACT

Methods, systems and machine-readable instructions for managing images are described. In one aspect, images are segmented into image clusters. A page layout for a contact sheet comprising thumbnail clusters each comprising thumbnails of the images in respective ones of the image clusters is generated. The page layout divides at least a portion of the contact sheet into regions each containing a respective one of the thumbnail clusters and at least one associated user input field. A description of the page layout is stored on a machine-readable medium.

25 Claims, 4 Drawing Sheets

OTHER PUBLICATIONS

Platt, AutoAlbum: Clustering Digital Photographs using Probabilistic Model Merging, IEEE 2000, pp. 1-5.*

Eddy et al., An Interactive Icon Index—Images of the Outer Planets, Google 1996, pp. 1-16.*

Eddy et al., Dynamic Visualization in Modelling and Optimization of Ill Defined Problems Case Studies and Generalizations, Google, pp. 1-20.*

Diakopoulos et a., Mediating Photo Collage Authoring, ACM Oct. 2005, pp. 183-186.*

* cited by examiner

CONTACT SHEET BASED IMAGE MANAGEMENT

BACKGROUND

Individuals are rapidly accumulating large collections of digital image content, including still images, text, graphics, animated graphics, and full-motion video images. This content may be presented individually or combined in a wide variety of different forms, including documents, presentations, still photographs, commercial videos, home movies, and meta data describing one or more associated digital content files. As these collections grow in number and diversity, individuals increasingly will require systems and methods for organizing and presenting the digital content in their collections. To meet this need, a variety of different systems and methods for organizing and presenting digital image content have been proposed, including manual digital image albuming systems that enable users to create digital photo albums manually and digital image albuming systems that provide various levels of automated image layout functionality.

Users typically find the process of managing a large collection of digital image content to be tedious and time consuming. Recognizing this common experience, efforts have been made to improve the interfaces through which users can manage their digital image content collections. Many image management systems are implemented by software programs that create graphical user interfaces that allow users to perform various image management tasks using a keyboard and a pointing device, such as a computer mouse. To operate these systems, however, users typically must have access to their personal computer systems. This is not always possible, especially when users are away from their homes.

Hewlett-Packard Company recently has developed a line of all-in-one printer/scanner/copier machines that allow users to print contact sheets containing thumbnail versions of the images that are stored in a memory card that is plugged into the machines. The thumbnail images (or simply "thumbnails") are distributed uniformly on the contact sheets. Adjacent to each thumbnail is a series of fields that provide options, such as the number of prints of an image to be printed and the size and type of paper on which the prints are to be printed. Users can fill in the fields with a marking instrument, such as a pencil. A user scans a marked contact sheet into the printer/scanner/copier machine and the machine automatically reads the handwritten information that was entered into the fields and prints images from the memory card in accordance with the entered information (e.g., prints the right numbers and sizes of only the requested images).

SUMMARY

In one aspect, the invention features an image management method in accordance with which images are segmented into image clusters. A page layout for a contact sheet is generated. The contact sheet comprises thumbnail clusters. Each of the thumbnail clusters comprises thumbnails of the images in respective ones of the image clusters. The page layout divides at least a portion of the contact sheet into regions each containing a respective one of the thumbnail clusters and at least one associated user input field. A description of the page layout is stored on a machine-readable medium.

The invention also features a system and machine-readable instructions for implementing the above-described electronic document processing method.

In another aspect, the invention features an image management apparatus that comprises a contact sheet, clusters of thumbnail images arranged in respective cluster regions on the contact sheet, and at least one user input field located in each of the cluster regions of the contact sheet.

In another aspect, the invention features an image management method in accordance with which user inputs are extracted from a contact sheet. The contact sheet comprises thumbnail images and one or more annotation user input fields respectively associated with at least one of the thumbnail images. Whether one or more of the extracted user inputs correspond to respective ones of the annotation user input fields is determined. In response to a determination that a given one of the extracted user inputs corresponds to a given one of the annotation user input fields, a link between the given user input and at least one of the thumbnail images associated with the given annotation user input field is generated.

In another aspect, the invention features an image management method in accordance with which user inputs are extracted from a contact sheet. The contact sheet comprises thumbnail images, one or more action user input fields respectively associated with at least one of the thumbnail images, and one or more destination user input fields. Whether one or more of the extracted user inputs correspond to respective ones of the destination user input fields is determined. In response to a determination that a given one of the extracted user inputs corresponds to a given one of the destination user input fields, an image of the given user input is associated with the at least one of the thumbnail images associated with the given destination user input field.

Other features and advantages of the invention will become apparent from the following description, including the drawings and the claims.

DETAILED DESCRIPTION

In the following description, like reference numbers are used to identify like elements. Furthermore, the drawings are intended to illustrate major features of exemplary embodiments in a diagrammatic manner. The drawings are not intended to depict every feature of actual embodiments nor relative dimensions of the depicted elements, and are not drawn to scale.

I. CONTACT SHEET BASED IMAGE MANAGEMENT OVERVIEW

The embodiments that are described in detail below provide improved contact sheet based interfaces that allow users to manage the digital image content in their collections. These embodiments automatically segment images into clusters and present corresponding clusters of thumbnails of the images on one or more contact sheets. A contact sheet may contain user-selectable options for managing the digital image content at the cluster level. A contact sheet also may contain fields for receiving handwritten annotations and storage destinations that will be linked to associated image clusters. In this way, these embodiments provide a simple, easy-to-use interface for managing digital image content that avoids the complexity and tedium often associated with digital image content management approaches that require a user to make decisions at the individual image level. This approach is particularly well-suited for performing a first level sort and management of a user's digital image content, especially when the user does not have access to tools (e.g., digital image management software tools) that enable the user to manage digital image content directly.

Figure 1:
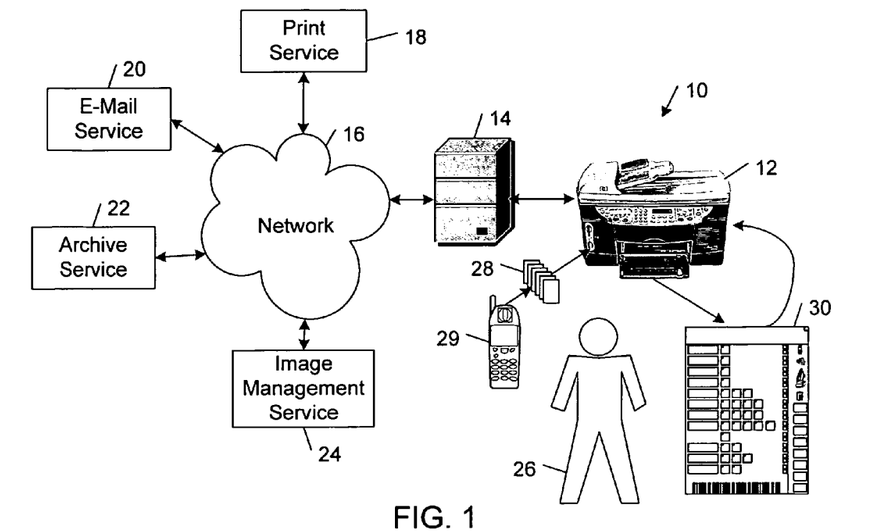
FIG. 1 is a diagrammatic view of an embodiment of a contact sheet based image management system.

FIG. 1 shows an embodiment of an image management system 10 that includes a contact sheet based interface system 12 and a computer 14. The computer 14 is connected a network 16, which allows the computer 14 to communicate with a wide variety of different service providers, including providers of a print service 18, an electronic mail (e-mail) service 20, an archive service 22, and an image management service 24.

In the illustrated implementation, the interface system 12 is implemented by an all-in-one printer/scanner/copier (e.g., an HP Officejet® 9100 available from Hewlett-Packard Company of Palo Alto, Calif., U.S.A.). In other implementations, the interface system 12 may be implemented by separate printing and scanning devices. The printing device may be a portable printer or a desktop printer (e.g., a LaserJet® printer available from Hewlett-Packard Company of Palo Alto, Calif., U.S.A.). The scanning device may be a scanner, such as a desktop optical scanner (e.g., a ScanJet® scanner available from Hewlett-Packard Company of Palo Alto, Calif., U.S.A.), a portable scanner (e.g., a CapShare® portable scanner available from Hewlett-Packard Company of Palo Alto, Calif., U.S.A.), or a facsimile machine.

In the illustrated implementation, the computer 14 is a server computer. In general, the computer 14 may be any type of personal computer, portable computer, or workstation computer that includes a processing unit, a system memory, and a system bus that couples the processing unit to the various components of the computer. The processing unit may include one or more processors, each of which may be in the form of any one of various commercially available processors. Generally, each processor receives instructions and data from a read-only memory and/or a random access memory. The system memory typically includes a read only memory (ROM) that stores a basic input/output system (BIOS) that contains start-up routines for the computer, and a random access memory (RAM). The computer 14 also may include a hard drive, a floppy drive, and CD ROM drive that contain respective computer-readable media disks that provide non-volatile or persistent storage for data, data structures and computer-executable instructions.

In operation, a user 26 transfers copies 28 of images that are stored on a portable image storage device 29 to the interface system 12. The images 28 may be complete or partial versions of any type of digital or electronic image, including: an image that was captured by an image sensor (e.g., a video camera, a still image camera, or an optical scanner) or a processed (e.g., filtered, reformatted, enhanced or otherwise modified) version of such an image; a computer-generated bitmap or vector graphic image; a textual image; and an iconographic image.

The portable image storage device 29 may be any type of portable electronic device that is capable of storing images. Exemplary implementations of the portable image storage device 29 include a digital still image camera, a digital video camera, a mobile phone, a laptop or notebook computer, a personal digital assistant, and a portable music player. In the illustrated implementation, the portable image storage device 29 is a mobile phone and the images 28 correspond to images that were captured by an integrated camera module of the mobile phone. The portable image storage device 29 may transfer the images 28 to the interface system 12 in any one of a wide variety of different ways. For example, in some implementations, the images 28 are stored on a removable memory card (e.g., a compact flash memory card, a smart card, or a memory stick) and the interface system 12 includes a module for reading images that are stored on the removable memory card. In other implementations, the images 28 may be transferred over a wired connection or a wireless connection that is established between the portable image storage device 29 and the interface system 12.

After the image copies 28 have been transferred from the portable image storage device 29, the interface system 12 generates at least one contact sheet 30. Each contact sheet 30 includes thumbnails of respective ones of the images 28. The thumbnails are arranged on the contact sheet 30 in clusters that correspond to a logical clustering of the images 28. The contact sheet 30 includes for each thumbnail cluster at least one associated user input field for receiving user input specifying actions that the image management system 10 will perform with respect to corresponding ones of the images 28.

The user 26 marks the contact sheet 30 with user input that specifies actions to be performed by the image management system 10. In some implementations, the user 26 also may mark the contact sheet 30 with cluster-specific annotations that the image management system 10 will associate with corresponding clusters of the images 28. In some implementations, the user 26 also may specify on the contact sheet 30 one or more custom destinations where the image management system 10 will store user-selected ones of the clusters of the images 28 in a logical file system.

After the user 26 has marked the contact sheet 30, the user feeds the contact sheet into the interface system 12. The interface system 12 scans the marked contact sheet to generate a scanned image. The interface system 12 extracts the user input from the scanned image and performs various actions with respect to the images 28 in accordance with the extracted user input. For example, the image management system 10 may transmit respective ones of the images 28 to the print service 18 for printing, to the e-mail service 20 for e-mailing, to the archive service 22 for archiving, and to the image management service 24 for performing one or more image management operations. In this way, the user 26 can perform a wide variety of different image management tasks simply by marking the contact sheet 30 with handwritten user input.

II. GENERATING A CONTACT SHEET

Figure 2:
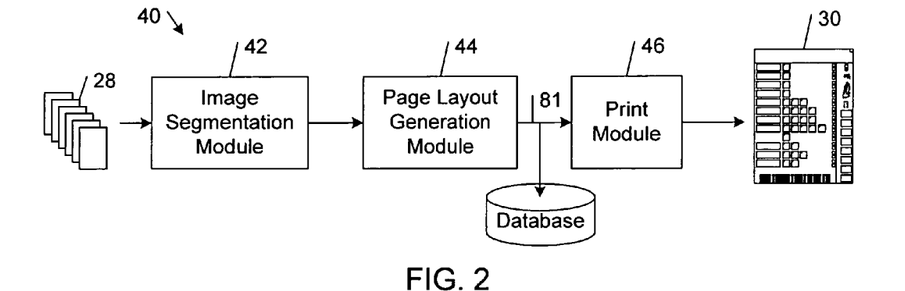
FIG. 2 is a block diagram of an embodiment of a contact sheet generation system.

FIG. 2 shows an embodiment of a contact sheet generation system 40 that includes an image segmentation module 42, a page layout generation module 44, and a print module 46. These modules 42-46 may be implemented in any computing or processing environment, including in digital electronic circuitry or in computer hardware, firmware, or software. In some embodiments, the image segmentation module 42, the page layout generation module 44, and the print module 46 are implemented by one or more respective software modules that are executed on the interface system 12, on the computer 14, or distributed across the interface system 12 and the computer 14. Computer process instructions for implementing the modules 42-46 and the data generated by the modules 42-46 are stored in one or more machine-readable media. Storage devices suitable for tangibly embodying these instructions and data include all forms of non-volatile memory, including, for example, semiconductor memory devices, such as EPROM, EEPROM, and flash memory devices, magnetic disks such as internal hard disks and removable disks, magneto-optical disks, and CD-ROMs.

Figure 3:
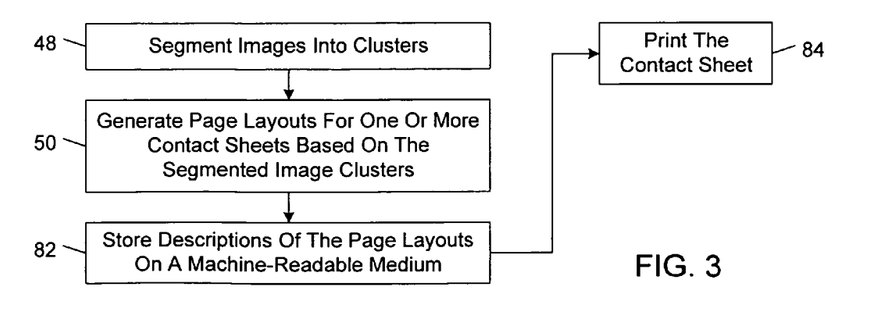
FIG. 3 is a flow diagram of an embodiment of a method of generating a contact sheet for managing a collection of images.

FIG. 3 shows an embodiment of a method by which the contact sheet generation system 40 generates the contact sheet 30. The image segmentation module 42 segments the images 28 into clusters (block 48). The images 28 may be clustered in any one of a wide variety of ways, including by spatial, temporal or other properties of the images 28. The images 28 may be clustered using, for example, k-means clustering or some other clustering method. In general, the clustering process attempts to form clusters that contain images that are related in some way (e.g., they correspond to the same event, the same location, or the same time period). This feature makes it likely that users will want to manage the images that are in the same cluster in the same way.

In the illustrated embodiment, the image segmentation module 42 clusters the images 28 in accordance with timestamps that are associated with the images 28. In this process, the image segmentation module 42 sorts the images 28 chronologically. The image segmentation module 42 then computes the geometric mean of all the time differences between adjacent ones of the sorted images 28. The image segmentation module 42 iterates through the sorted images 28 to build clusters of the images 28. If the time difference between a current image and a previous image is less than the geometric mean, the current image is assigned to the current cluster; otherwise, the current image is assigned to a new cluster.

In other embodiments, the image segmentation module 42 may assign images to clusters based on a fixed cluster time period. Alternatively, the image segmentation module 42 may cluster images based on computed measures of relatedness between ones of the images 28.

After the images 28 have been clustered by the image segmentation module 42 (block 48), the page layout generation module 44 generates page layouts for one or more of the contact sheets 30 based on the segmented image clusters (block 50). In this process, the page layout generation module 44 generates thumbnail versions of the images 28 and segments the thumbnails into clusters corresponding to the clusters of images 28 that were built by the image segmentation module 42. The page layout generation module 44 lays out the thumbnail clusters on the contact sheets in accordance with the page layouts, which divide respective ones of the contact sheets into different regions.

Figure 4:
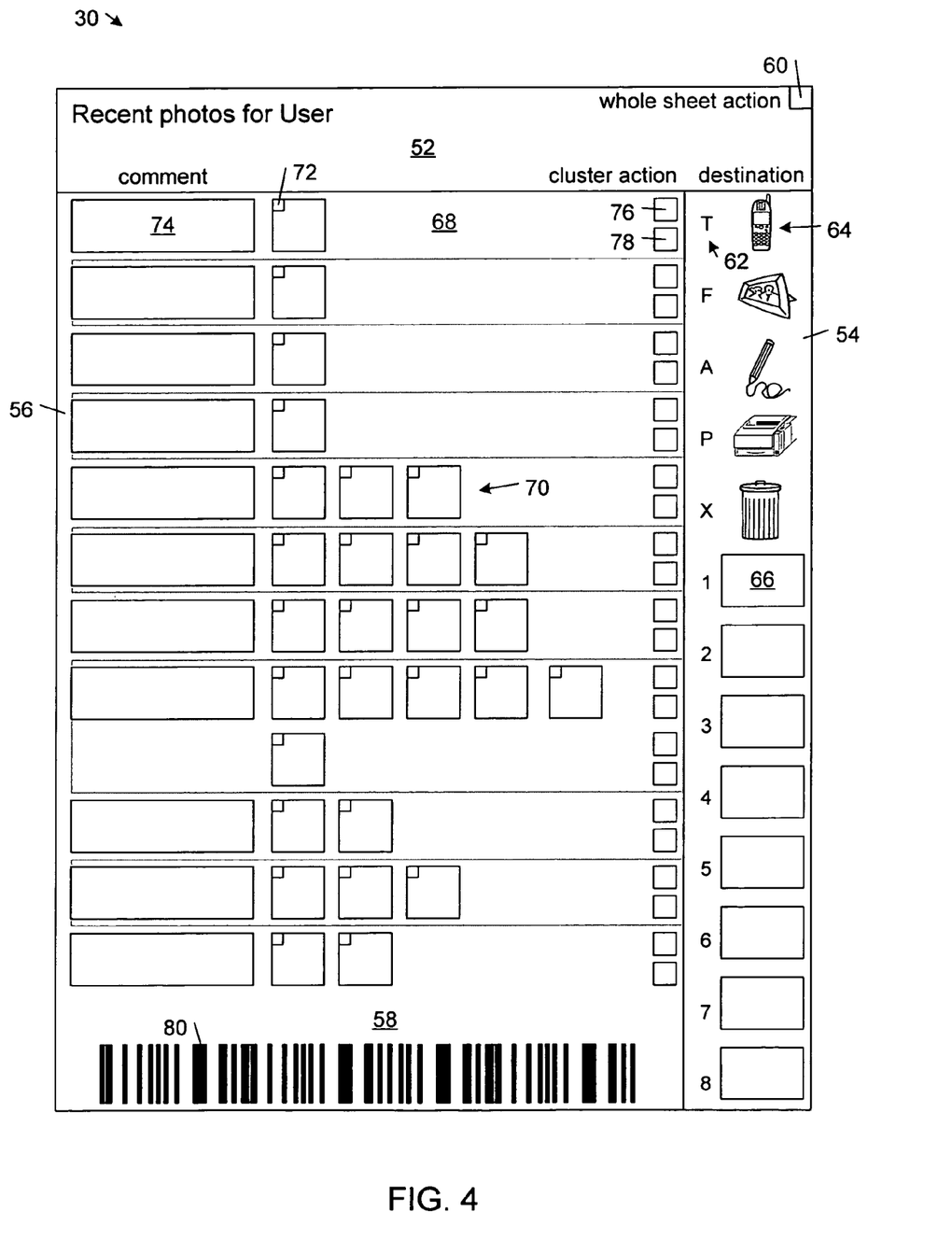
FIG. 4 is a front view of an embodiment of a page layout for a contact sheet that is generated in accordance with the method of claim 2.

FIG. 4 shows an exemplary implementation of a page layout that is generated by the page layout generation module 44 for a exemplary set of images 28. In this implementation, the page layout divides the contact sheet 30 into a header region 52, an index region 54, an interface region 56, and a barcode region 58.

The header region 52 contains a descriptive title for the contact sheet 30 (e.g., "Recent photos for User") and a set of labels (e.g., "destination", "comment", and "cluster action") that describe the index region 54 and the user input fields of the interface region 56. The header region 52 additionally includes a user input field 60 for receiving user input specifying an image management action that will be applied to all of the images 28 that correspond to the thumbnails appearing on the contact sheet 30.

The index region 54 includes a list of action codes 62 that designate respective machine-implementable actions that can be performed by the image management system 10. The index region 54 includes a set of predefined action codes each of which is associated with an iconographic representation 64 of the corresponding machine-implementable action.

In the illustrated implementation, the index region 54 includes the following predefined or default action codes: "T", "F", "A", "P", and "X". The "T" action code stands for "Talk" and is intended to be used to designate image clusters that a user may want to discuss with others. The "F" action code stands for "Favorites" and is intended to be used to designate image clusters that are to be stored in an image file location labeled "Favorites". The "A" action code stands for "Annotation" and is intended to be used to designate image clusters that a user would like to annotate at a later time. The "P" action code stands for "Print" and is intended to be used to designate image clusters that are to be placed in a print queue that is associated with the user. The "X" action code stands for "Delete" and is intended to be used to designate image clusters that are to be deleted by the image management system 10.

In the illustrated implementation, the index region 54 additionally includes a set of action codes (e.g., "1", "2", . . . , "8") that are associated with respective destination user input fields 66. Each of the destination user input fields 66 is intended to be used to specify a respective storage location in a logical file system for user-selected clusters of the images 28. In some implementations, the storage locations are labeled with icons corresponding to bitmap images of the user input that is contained in the destination user input fields 66. In other implementations, the image management system 10 may perform optical character recognition on the user input that is contained in the destination user input fields 66 to extract names for the corresponding storage locations.

The interface region 56 is subdivided into horizontal rows 68. In the illustrated implementation, adjacent ones of the rows 68 are demarcated by different background colors. Each row 68 contains a respective one of the thumbnail clusters 70. As shown in FIG. 4, each thumbnail cluster 70 includes one or more thumbnails that are arranged in a left-aligned array. Superimposed over each of the thumbnails is a delete field 72. The image management system 10 responds to user input in a delete field 72 that is associated with a given thumbnail by performing a delete operation with respect to the image 28 corresponding to the given thumbnail. For example, in some implementations, the image management system 10 may delete the corresponding one of the images 28 from the portable image storage device 29.

Each row 68 additionally includes a cluster-specific annotation (or comment) user input field 74 and two cluster-specific action user input fields 76, 78. The annotation user input fields 74 are intended to be used to specify respective labels for the corresponding image clusters. In some implementations, the images corresponding to a given thumbnail cluster 70 are linked to a bitmap image of the user input contained in the associated annotation user input fields 74. The link may be stored in a header (e.g., an EXIF header) of the images or in a separate link data structure. In other implementations, the image management system 10 may perform optical character recognition on the user input contained in the annotation user input fields 74 to extract text that may be used to derive file names for the images in the corresponding clusters. The action user input fields 76, 78, on the other hand, are intended to be used to specify respective ones of the action codes 62 that are listed in the index region 54. The image management system 10 performs optical character recognition on the user input that is contained in the action user input fields 76, 78 to determine which of the action codes 62 that are listed in the index region 54 corresponds to the user input.

The barcode region 58 includes a barcode 80 that encodes information about the page layout of the contact sheet 30. Among the various types of information that may be encoded in the barcode are: a unique identifier for the contact sheet 30; a unique identifier for the user; the storage location address of a description of the page layout; and the storage location addresses of the ones of the images 28 corresponding to the thumbnails appearing on the contact sheet. The encoded information may be presented in any type of one-dimensional or two-dimensional barcode format provided it has sufficient capacity to store the required information in the space available in the barcode region 58.

Referring back to FIG. 3, after the page layout generation module 44 generates the page layouts for the one or more contact sheets (block 50), the page layout generation module 44 stores descriptions 81 of the page layouts on a machine-readable medium (block 82). The page layout descriptions 81 may be described in XML (eXtensible Markup Language). Storage devices suitable for tangibly embodying these instructions and data include all forms of non-volatile memory, including, for example, semiconductor memory devices, such as EPROM, EEPROM, and flash memory devices, magnetic disks such as internal hard disks and removable disks, magneto-optical disks, and CD-ROMs.

The print module 46 prints the contact sheets in accordance with the page layout descriptions that are generated by the page layout generation module 44 (block 84).

III. PROCESSING A MARKED CONTACT SHEET

Figure 5:
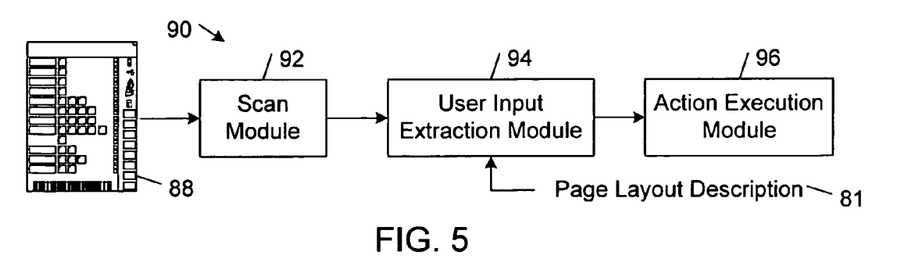
FIG. 5 is a block diagram of an embodiment of a contact sheet processing system.

FIG. 5 shows an embodiment of a system 90 for processing a marked contact sheet 88 containing user input. The contact sheet processing system 90 includes a scan module 92, a user input extraction module 94, and an action execution module 96. These modules 92-96 may be implemented in any computing or processing environment, including in digital electronic circuitry or in computer hardware, firmware, or software. In some embodiments, the scan module 92, the user input extraction module 94, and the action execution module 96 are implemented by one or more respective software modules that are executed on the interface system 12, on the computer 14, or distributed across the interface system 12 and the computer 14. Computer process instructions for implementing the modules 92-96 and the data generated by the modules 92-96 are stored in one or more machine-readable media. Storage devices suitable for tangibly embodying these instructions and data include all forms of non-volatile memory, including, for example, semiconductor memory devices, such as EPROM, EEPROM, and flash memory devices, magnetic disks such as internal hard disks and removable disks, magneto-optical disks, and CD-ROM.

Figure 6:
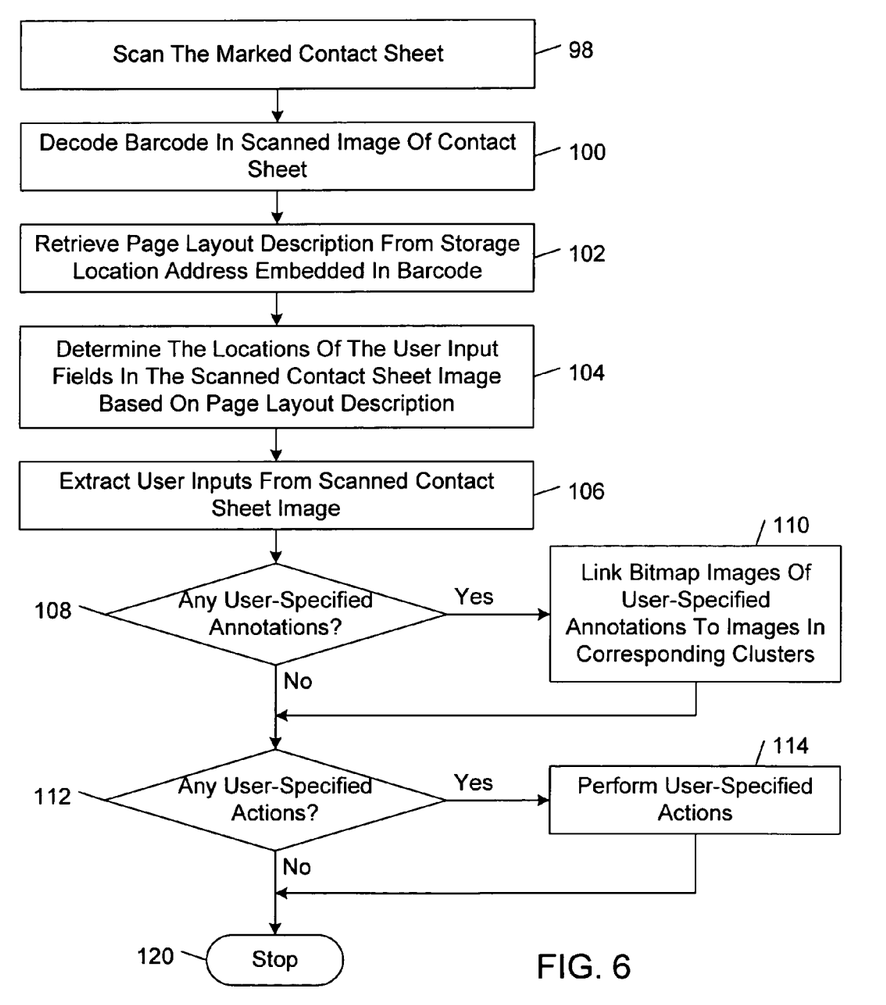
FIG. 6 is a flow diagram of an embodiment of a method of processing a marked contact sheet.
Figure 7:
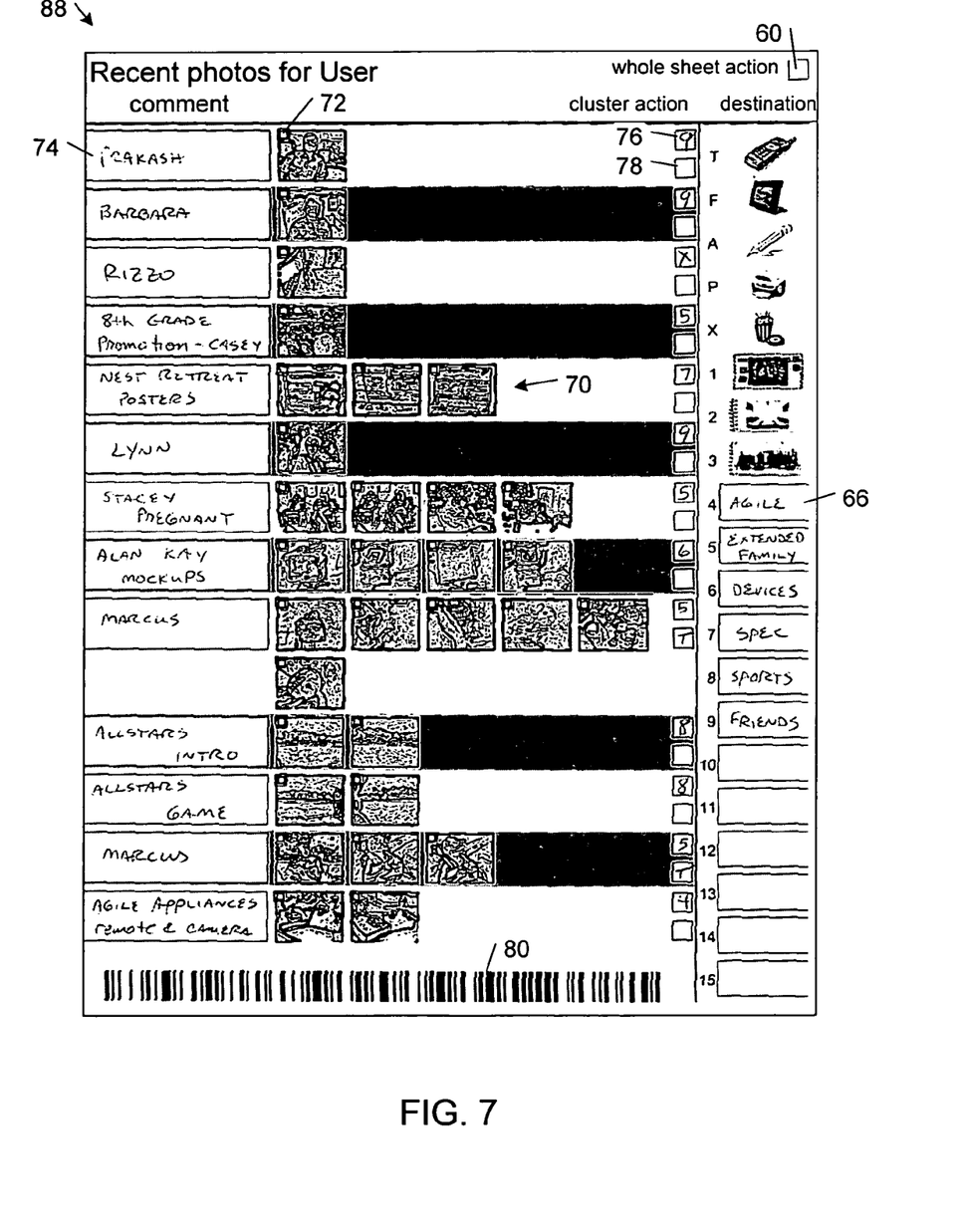
FIG. 7 is a front view of a scanned image of an embodiment of a marked contact sheet containing user input.

FIG. 6 shows an embodiment of a method by which the contact sheet processing system 90 processes the marked contact sheet 88. In accordance with this method, the scan module 92 generates a scanned image of the marked contact sheet 88 (block 98). FIG. 7 shows a scanned image of an exemplary implementation of the marked contact sheet 88.

The user input extraction module 94 detects and decodes the barcode 80 in the scanned image (block 100). The user input extraction module 94 then retrieves the page layout description 81 from the storage location address that is encoded in the barcode 80 (block 102). The user input extraction module 94 determines the locations of all of the user input fields (i.e., user input fields 60, 66, 72, 74, 76, and 78) in the scanned image of the marked contact sheet 88 based on the retrieved page layout description 81 (block 104). The user input extraction module 94 then extracts the user inputs from the scanned image of the marked contact sheet 88 (block 106). In this process, the user input extraction module 94 may perform optical character recognition on areas of the scanned image corresponding to the user input fields. The user input extraction module 94 also may copy bitmap images from the areas of the scanned image corresponding to the annotation and destination user input fields 74, 66.

The action execution module 96 performs actions with respect to ones of the images 28 corresponding to the thumbnails appearing on the marked contact sheet 88.

If there are any user-specified annotations contained in the annotation user input fields 74 (block 108), the action execution module 96 links bitmap images of the user-specified annotations to ones of the images 28 in the corresponding clusters (block 110). These annotations may be presented together with the images in the corresponding cluster by a suitably configured image presentation system.

If there are any user-specified actions contained in the action input fields 60, 76, 78 (block 112), the action execution module 96 performs the user-specified actions (block 114). Among the exemplary types of actions that may be performed by the action execution module 96 are the following:

1. Move user-designated ones of the image clusters to a folder in a logical file system. The folder may be a predefined folder (e.g., a "Talk" folder, a "Favorites" folder, or an "Annotation" folder) or the folder may be defined by user input that is contained in the destination user field 66. The user-defined folder may be associated with an icon corresponding to a bitmap image of the user input contained in the destination user input field 66.
2. Move user-designated ones of the image clusters to a print queue.
3. Delete user-designated ones of the image clusters.
4. Transmit user-designated ones of the image clusters to one or more of the service providers 18-24.

After all of the user-specified actions have been performed, the contact sheet processing method terminates (block 120).

IV. CONCLUSION

The embodiments that are described in detail above provide a simple, easy-to-use interface for managing digital image content that avoids the complexity and tedium often associated with digital image content management approaches that require a user to make decisions at the individual image level. This approach is particularly well-suited for performing a first level sort and management of a user's digital image content, especially when the user does not have access to tools (e.g., digital image management software tools) that enable the user to management digital image content directly.

Other embodiments are within the scope of the claims.

For example, in the above-described embodiments, images are transferred to the interface system 12 from the portable image storage device 29. In other embodiments, images may be transferred to the interface system 12 from any type of device or system that is capable of storing images, including non-portable devices and systems.

What is claimed is:

1. An image management method, comprising:
  segmenting images into image clusters;
  generating a page layout for a contact sheet comprising thumbnail clusters each comprising thumbnails of the images in respective ones of the image clusters, wherein the page layout divides at least a portion of the contact sheet into regions each containing a respective one of the thumbnail clusters and at least one associated user input field; and storing a description of the page layout on a machine-readable medium.

2. The method of claim 1, wherein the segmenting comprises extracting temporal information from the images and grouping the images into the image clusters based on the extracted temporal information.

3. The method of claim 1, wherein the page layout comprises a label designating a set of the user input fields as annotation fields.

4. The method of claim 3, further comprising generating respective links between ones of the image clusters and user input in corresponding ones of the designated annotation user input fields in a scanned image of the contact sheet.

5. The method of claim 1, wherein the page layout defines an index region of the contact sheet comprising a list of candidate user inputs for ones of the user input fields.

6. The method of claim 5, wherein the index region comprises an action code designating a machine-implementable action to be performed with respect to ones of the image clusters corresponding to thumbnail clusters associated with user input fields containing the action code.

7. The method of claim 6, wherein the index region additionally comprises an iconographic representation of the machine-implementable action.

8. The method of claim 6, further comprising performing the action designated by the action code with respect to ones of the image clusters corresponding to thumbnail clusters associated with user input fields in a scanned image of the contact sheet containing user input corresponding to the action code.

9. The method of claim 5, wherein the index region comprises a destination user input field corresponding to a machine-implementable action associating an image of user input in the destination user input field with ones of the image clusters corresponding to thumbnail clusters associated with user input fields containing user input designating the destination user input field.

10. The method of claim 9, further comprising associating a bitmap image of user input in the destination user input field of a scanned image of the contact sheet with ones of the image clusters corresponding to thumbnail clusters associated with user input fields containing user input designating the destination user input field.

11. The method of claim 1, wherein the page layout comprises a respective delete field associated with each of the thumbnails and corresponding to a machine-implementable action deleting ones of the images corresponding to ones of the thumbnails associated with ones of the delete fields containing user input.

12. The method of claim 1, further comprising generating a machine-readable barcode comprising symbols encoding a storage location address of the page layout description.

13. The method of claim 12, further comprising decoding the storage location address of the page layout description from the machine-readable barcode in a scanned image of the contact sheet, and retrieving the page layout description based on the decoded storage address location.

14. The method of claim 13, further comprising extracting user input from the scanned image of the contact sheet based on the retrieved page layout location.

15. The method of claim 1, wherein each of the user input fields applies exclusively to all the images represented by the thumbnails in the thumbnail cluster that is associated with the user input field.

16. An image management system, comprising:

a computer-readable medium storing computer-readable instructions; and a data processing unit coupled to the memory, operable to execute the instructions, and based at least in part on the execution of the instructions operable to perform operations comprising segmenting images into image clusters, generating a page layout for a contact sheet comprising thumbnail clusters each comprising thumbnails of the images in respective ones of the image clusters, wherein the page layout divides at least a portion of the contact sheet into regions each containing a respective one of the thumbnail clusters and at least one associated user input field, and each of the user input fields applies exclusively to all the images represented by the thumbnails in the associated thumbnail cluster, and storing a description of the page layout.

17. A machine-readable medium storing machine-readable instructions for causing a machine to perform operations comprising:

segmenting images into image clusters;

generating a page layout for a contact sheet comprising thumbnail clusters each comprising thumbnails of the images in respective ones of the image clusters, wherein the page layout divides at least a portion of the contact sheet into regions each containing a respective one of the thumbnail clusters and at least one associated user input field; and storing a description of the page layout on a machine-readable medium.

18. The machine-readable medium of claim 17, wherein the page layout comprises a label designating a set of the user input fields as annotation fields.

19. The machine-readable medium of claim 18, wherein the instructions additionally cause the machine to perform operations comprising generating a machine-readable barcode comprising symbols encoding a storage location address of a page layout description of the contact sheet and incorporating the machine-readable barcode into the page layout.

20. The machine-readable medium of claim 17, wherein the page layout defines an index region comprising a list of candidate user inputs for ones of the user input fields.

21. The machine-readable medium of claim 20, wherein the index region comprises an action code designating a machine-implementable action to be performed with respect to ones of the image clusters corresponding to thumbnail clusters associated with user input fields containing the action code.

22. The machine-readable medium of claim 21, wherein the index region additionally comprises an iconographic representation of the machine-implementable action.

23. The machine-readable medium of claim 20, wherein the index region comprises a destination user input field corresponding to a machine-implementable action associating an image of user input in the destination user input field with ones of the image clusters corresponding to thumbnail clusters associated with user input fields containing user input designating the destination user input field.

24. An image management method, comprising:
extracting user inputs from a contact sheet comprising thumbnail images and one or more annotation user input fields respectively associated with at least one of the thumbnail images;
determining whether one or more of the extracted user inputs correspond to respective ones of the annotation user input fields; and
in response to a determination that a given one of the extracted user inputs corresponds to a given one of the annotation user input fields, generating a link between an image of the given extracted user input and at least one original image corresponding to the at least one thumbnail image that is respectively associated with the given annotation user input field, and displaying the original image in association with the image of the given extracted user input on a physical display device.

25. An image management method, comprising:
extracting user inputs from a contact sheet comprising thumbnail images, one or more action user input fields respectively associated with at least one of the thumbnail images, and one or more destination user input fields;
determining whether any of the extracted user inputs designates any of the destination user input fields in any of the action user input fields; and
in response to a determination that a given one of the extracted user inputs designates a given one of the destination user input fields in a given one of the action user input fields, storing at least one original image corresponding to the at least one thumbnail image that is associated with the given action user input field on a computer-readable medium in a respective storage location in a logical file system, and labeling the respective storage location with an iconographic image of the given extracted user input.

* * * * *